United States Patent [19]
Parenti, Jr. et al.

[11] 3,905,884
[45] Sept. 16, 1975

[54] ELECTROLYSIS CELL SYSTEM INCLUDING RECIRCULATING PRODUCT GAS STREAM FOR COOLING THE CELL

[75] Inventors: Edmund K. Parenti, Jr., Manchester; David P. Bloomfield; Paul E. Grevstad, both of West Hartford, all of Conn.; Daniel W. Beal, San Francisco, Calif.

[73] Assignee: United Technologies Corporation, Hartford, Conn.

[22] Filed: Nov. 20, 1974

[21] Appl. No.: 525,610

[52] U.S. Cl. ............... 204/129; 204/274; 204/278; 136/86 R; 136/86 C
[51] Int. Cl. ........................ C25b 1/02; H01m 8/08
[58] Field of Search ................... 204/274, 278, 129; 136/86 R, 86 C

[56] References Cited
UNITED STATES PATENTS
3,507,702 4/1970 Sanderson ..................... 136/86 C
3,779,811 12/1973 Bushnell ..................... 136/86 R

*Primary Examiner*—R. L. Andrews
*Attorney, Agent, or Firm*—Stephen E. Revis

[57] ABSTRACT

An electrolysis cell system includes a compact electrolysis cell comprising gas diffusion electrodes on each side of an aqueous electrolyte retaining matrix. A portion of the hydrogen gas produced by the cell has water added thereto and is recirculated through a thermal exchange portion of the cell to remove waste heat from the cell and create a temperature gradient thereacross. The amount of water introduced into the recirculating gas stream is controlled to maintain a predetermined temperature of the gas stream emerging from the thermal exchange portion of the cell. The stream leaves the thermal exchange portion of the cell and reenters the cell in the gas space adjacent one of the electrodes. In a preferred embodiment the water added is sprayed into the recirculating gas stream and the heat laden stream emerging from the thermal exchange portion of the cell passes through a condenser where water vapor in the stream is converted to liquid and where heat is removed from the stream; the water vapor partial pressure of the stream reentering the cell is controlled by keeping the temperature of the stream leaving the condenser within a certain temperature range.

19 Claims, 1 Drawing Figure

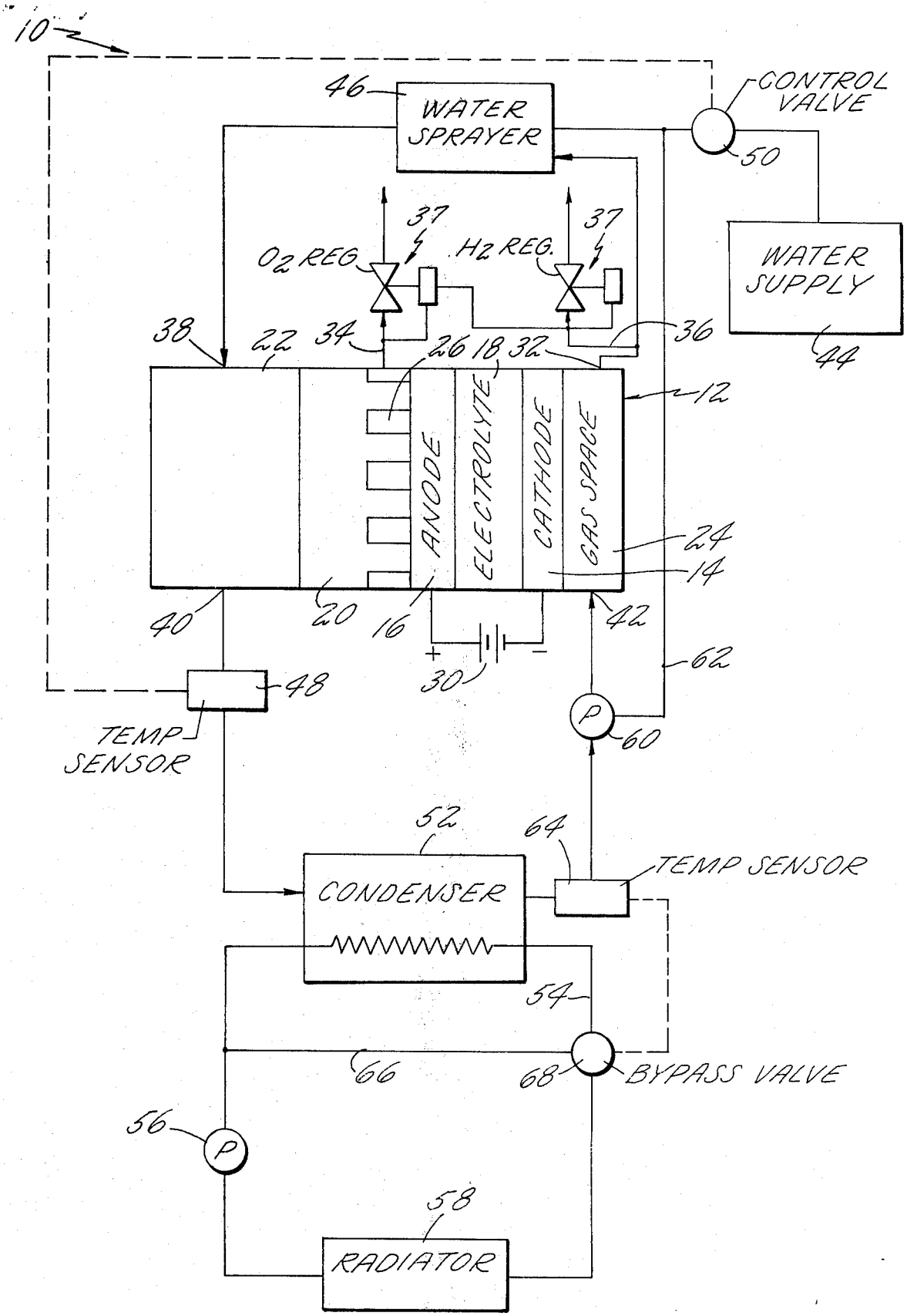

ELECTROLYSIS CELL SYSTEM INCLUDING RECIRCULATING PRODUCT GAS STREAM FOR COOLING THE CELL

BACKGROUND OF THE INVENTION

1. Field of the Invention

This invention relates to electrolysis cells and more particularly to a compact electrolysis cell system.

2. Description of the Prior Art

It is well known that it is possible to operate fuel cells in a reverse mode so that they generate hydrogen and oxygen when supplied with liquid water and electric power. Cells that operate in that manner are referred to as electrolysis cells. In one common type of electrolysis cell two solid electrodes which may, for example, be made from nickel, are spaced apart in a free liquid electrolyte and a potential is applied across the electrodes. Water in the electrolyte is electrolyzed liberating hydrogen and oxygen into the electrolyte in the form of gas bubbles. The water used is replenished by adding it directly to the liquid electrolyte between the electrodes. Generally the electrolyte is also used to cool the cell; for example, a recirculating loop of electrolyte picks up waste heat from the cell, rejects this heat outside the cell, and then returns to the cell, makeup water being added somewhere in the loop. Another type of cell called the Bacon Cell utilizes two spaced apart dual porosity electrodes enclosing a free liquid electrolyte trapped in a sealed compartment. These electrodes may, for example, be made of sintered nickel. However, since both sides of the electrodes are metallic, electrolysis can occur in the electrolyte as well as on the gas side of the electrode. If this cell were to operate in a zero gravity environment, such as in a space craft, the gas in the electrolyte would have to be removed such as by the use of a liquid-gas vortex separator, thus complicating the design.

Although these electrodes could be modified so as to be made of inert material on the fine pore side exposed to the electrolyte to prevent gas formation within the bulk of the electrolyte, this type of cell would have to operate at relatively high temperatures. In either of the foregoing systems, wherein the electrolyte is a circulating or noncirculating free liquid disposed between or around the electrodes, and is not held within a matrix, each cell within a stack of cells would necessarily have to be fairly thick in order to either permit electrolyte to flow or to prevent the electrodes from touching.

It is often desirable that an electrolysis cell be as compact as possible. Thus, it would be desirable to use, as an electrolysis cell, a fuel cell similar to the type shown in FIG. 2 of Sanderson U.S. Pat. No. 3,507,702 or Bushnell et al U.S. Pat. No. 3,779,811, both of common assignee with the present application. In the type of cell shown in Sanderson the electrolyte is held in a matrix trapped between partially hydrophobic partially hydrophilic gas diffusion electrodes; a gas space is formed on the nonelectrolyte side of each electrode for carrying the oxidant and fuel. The matrix is usually of very fine pore structure with a high resistance to bubble formation in the electrolyte. This type of cell is very thin compared to the earlier mentioned types since there is no requirement that the electrolyte must be pumped through the system, and therefore the electrodes may be spaced very close to each other. In the fuel cell system of Sanderson there is a separate coolant loop for carrying a liquid coolant through the fuel cell to remove waste heat therefrom. Also, moisture is added to the air entering the cathode side of the fuel cell to provide a positive means of fuel cell water balance control over the range of ambient temperature and humidity expected. In an electrolysis cell water is continuously being used up and must therefore be continuously supplied. Of course, if an electrolysis cell system used a cell constructed similar to the cell of FIG. 2 in Sanderson there would not be the usual circulating electrolyte for water addition. In Sanderson water is brought into the cell in the incoming air stream. But, in an electrolysis cell system the electrolysis cell produces oxygen and hydrogen and thus there would be no incoming reactant gas stream for carrying water vapor to the cell as there is in Sanderson. In any event, Sanderson adds water merely to prevent dryout of the electrolyte matrix near the inlet thus providing for more uniform water removal. There is no means for providing the proper amount of water input if the Sanderson system were an electrolysis system using up water.

SUMMARY OF THE INVENTION

One object of the present invention is an electrolysis cell system using an electrolysis cell having an electrolyte trapped in a matrix between a pair of gas porous electrodes.

A further object of the present invention is a simplified electrolysis cell system wherein the cell is fed with water and cooled by a single recirculating fluid stream.

Yet another object of the present invention is an electrolysis cell system wherein the circulation requirement for the cooling fluid is minimized thereby reducing the size of the pumps used to circulate the cooling fluid.

Accordingly, the present invention is an electrolysis cell system including an electrolyte matrix sandwiched between a pair of gas porous electrodes wherein one of the products of electrolysis recirculates through the cell and has water added thereto for cooling the cell. The water added also replenishes the water used, and the amount added is controlled to maintain a constant temperature of the recirculating stream as it exits from the cell, having picked up waste heat therefrom and established a temperature gradient thereacross. Means are also included in the system for establishing the desired partial pressure of water vapor in the recirculating product gas entering the cell. Thus, water supply and heat removal are accomplished with a single recirculating product gas loop and one pump.

The subject matter of this application is related to the subject matter of a commonly assigned application titled "Electrolysis Cell System" by R. Sanderson, M. Katz and J. Hirschenhofer filed on even date herewith.

The foregoing and other objects, features and advantages of the present invention will become more apparent in the light of the following detailed description of preferred embodiments thereof as illustrated in the accompanying drawing.

BRIEF DESCRIPTION OF THE DRAWING

The sole FIGURE is a schematic of an electrolysis cell system according to the present invention.

DESCRIPTION OF THE PREFERRED EMBODIMENTS

Referring to FIG. 1, an electrolysis cell system 10 according to a preferred embodiment of the subject invention is shown. The system 10 comprises an electrolysis cell 12. Only one cell is shown, however, any number of cells may be combined to form a multi-cell stack which could be used in this system. The cell 12 is represented schematically as comprising a cathode 14, an anode 16, a porous matrix 18 sandwiched therebetween and filled with an aqueous electrolyte, a porous backup plate 20 adjacent the anode 16, and a thermal exchange portion 22. The cell also includes gas spaces 24, 26 on the nonelectrolyte side of the cathode and anode, respectively. The thermal exchange portion 22 may be of any well known construction suitable for passing a cooling fluid therethrough for removing heat from the cell 12. For example, it may be a plate having cooling fluid passages therethrough. The plate with its attendant passages would be configured and arranged so that heat generated in the cell during operation thereof is transferred to the fluid passing through the passages in a manner well known to those skilled in the art. The porous backup plate 20 serves as an electrolyte reservoir, in a manner well known to those skilled in the art, thereby allowing large variations in the electrolyte volume without flooding or drying of the electrodes. If the electrolysis cell system 10 were required to operate in only a narrow power range then a porous backup plate 20, which is also sometimes known as an electrolyte storage matrix, may not be required.

In this embodiment a base electrolyte such as KOH is contemplated although it should be apparent to persons with ordinary skill in the art that the system of the present invention is equally as applicable to acid cells. It is also contemplated that the electrodes are of the gas porous type and may comprise, for example, a metal support screen or mesh in intimate contact with a catalyst layer preferably comprising an admixture of catalyst and hydrophobic polymer binder. Although the specific material of which the electrodes are made and their construction is not considered critical to the present invention, it is required that the electrodes be gas porous so that product gas bubbles are not retained in the electrolyte and so that process water may be added in vapor form from the nonelectrolyte side of the electrodes. Electrodes of this type are commonly referred to as gas diffusion electrodes, and are suitable for either terrestrial or zero-gravity operation. A cell of the type just described and which may be used in the system 10 of the present invention is shown in FIG. 1 of Bushnell et al U.S. Pat. No. 3,779,811 and is incorporated herein by reference, although the present invention is not limited to that precise configuration.

During operation an electric potential is applied by a power source 30 causing electrolysis of the water fraction of the electrolyte within the matrix 18 and liberating oxygen from the gas space 26 on the anode side of the cell and hydrogen from the outlet 32 of the gas space 24 on the cathode side of the cell. In this embodiment all of the oxygen and a portion of the hydrogen is removed from the cell for either storage or immediate use through conduits 34, 36, respectively. These product gases pass through pressure regulating means 37 for maintaining substantially equivalent pressures within the gas spaces 24 and 26 which is usually necessary for proper operation of the cell as is well known in the art. A portion of the hydrogen produced is recirculated through the cell and is the vehicle for carrying a coolant fluid through the cell. The recirculating hydrogen leaves the cell at the outlet 32 of the gas space 24 and reenters the cell at the entrance 38 to the thermal exchange portion 22. It leaves the cell again through the exit 40 of the thermal exchange portion 22 and reenters once again at the inlet 42 of the gas space 24. Although in this embodiment hydrogen is recirculated, it should be apparent to persons with ordinary skill in the art that the oxygen could be recirculated instead.

Water from a pressurized water supply 44 is introduced into the recirculating hydrogen stream through a water sprayer 46 immediately upstream of the entrance 28 so that it enters the thermal exchange portion 22 in droplet form. Droplets are desirable because they vaporize much more easily and therefore cool the cell much more efficiently, minimizing the pumping requirement for the recirculating gas stream and the amount of water required. Although in this embodiment the water is added to the recirculating stream precisely at the location of the sprayer 46, it may instead be added elsewhere, such as between the condenser 52 and the pump separator 60. The sprayer 46 or other means would still be desirable to convert the water into droplet form as it enters the thermal exchange portion 22.

A temperature sensor 48 is positioned downstream of the exit 40 to measure the temperature of the recirculating hydrogen stream emerging from the thermal exchange portion 22. A control valve 50 is responsive to the temperature sensor 48 and controls the amount of water added to the recirculating hydrogen stream so that the temperature of the stream emerging from the thermal exchange portion 22 is maintained at a predetermined value which may be different for various cell operating conditions, such as for high power operation and for low power operation. As the mixture of hydrogen gas and water droplets pass through the thermal exchange portion 22 of the cell 12 the water droplets evaporate, absorbing heat and locally raising the partial pressure of water vapor in the stream. Near the exit 40 the increased partial pressure of water vapor causes the water droplets to evaporate at a higher temperature thus providing a temperature gradient across the cell. Since the exit 40 is on the same side of the cell as the inlet 42 to the gas space 24 the temperature of the cell 12 at the inlet 42 will be higher than the temperature of the cell at the outlet 32. This is the preferred (although not required) direction for the temperature gradient as will hereinafter be explained.

The system 10 also automatically adds makeup water into the stream. For example, as water is used up by the electrolysis cell 12 there will thus be less water passing through the water sprayer 46. Thus, less heat will be removed from the cell causing the exit temperature sensed by the thermal sensor 48 to increase. When the temperature sensed increases the valve 50 opens allowing additional water to be introduced through the sprayer 46 into the recirculating hydrogen stream until the temperature goes down to a predetermined value whereupon the valve 50 closes. Thus the system tends to keep a constant volume of water recirculating and automatically compensates for water leaving the system with the product gas streams as well as for high and low power operation wherein the amount of water electrolyzed varies.

The recirculating stream as it emerges from the thermal exchange portion 22 includes water in both vapor and liquid form. The stream thereupon passes through a condenser 52 where at least a portion of the water vapor is changed back to liquid water. Heat which was picked up in the cell may also be rejected from the stream at this point. In this embodiment a coolant is circulated through the condenser by means of a conduit 54 and a pump 56 to remove heat therefrom and thereby condense the water vapor in the recirculating gas stream. The coolant passes through a radiator 58 which may, for example, reject the heat to the surrounding environment. It should be apparent to one with ordinary skill in the art that any of many well known means for condensing water vapor and removing heat from the recirculating gas stream may be utilized in the system 10 of the subject invention. Upon leaving the condenser 52 the gas stream, which still has water in both vapor and liquid form, passes into a pump separator 60 which separates the liquid water from the water vapor. The hydrogen gas and remaining water vapor leave the pump separator 60 and reenter the fuel cell 12 at the inlet 42. The separated liquid water leaves the pump 60 by means of conduit 62 and is bypassed around the cell 12 and is reintroduced into the circulating hydrogen stream in droplet form through the water sprayer 46.

It is desirable to control the partial pressure of water vapor in the gas stream entering the inlet 42 so that it is equivalent to the equilibrium partial pressure of water over the electrolyte. If the partial pressure of water vapor in the gas stream at the inlet 42 is too high the matrix 18 may become flooded despite the porous backup plate 20; or, if the partial pressure of water vapor is too low the matrix may dry out. In this embodiment the partial pressure of the water vapor in the gas stream at the inlet 42 is established by controlling the temperature of the gas stream leaving the condenser 52. A temperature sensor 64 is located in the gas stream immediately downstream of the condenser 52. The conduit 54 for carrying the coolant through the condenser 52 includes a bypass conduit 66 for bypassing coolant around the condenser 52. The amount of coolant bypassed is controlled by a bypass valve 68. The bypass valve 68 operates in response to the temperature sensed by the temperature sensor 64 to maintain the temperature 64 within a predetermined temperature range so that the partial pressure of water vapor at the inlet 42 is a satisfactory level which insures neither flooding nor drying out of the matrix 18.

As heretofore mentioned it is desirable that the temperature of the cell 12 decrease from the inlet 42 to the outlet 32. This will be the case in the embodiment shown since the exit 40 of the thermal exchange portion 22 is on the same side of the cell as the inlet 42 to the gas space 24. Thus the coolant (i.e., water in droplet form) flows through the thermal exchange portion 22 counter to the hydrogen gas entering the gas space 24. As the moist hydrogen stream enters the inlet 42 and moves past the cathode more and more water is removed from the stream resulting in a decrease in the water partial pressure of the gas stream from the hot inlet 42 to the cool exit 32. The fact that the equilibrium partial pressure of water vapor over the electrolyte and partial pressure of water vapor in the gas stream both decrease from the inlet 42 to the outlet 32 helps to maintain, as close as possible, an even concentration of electrolyte across the cell for most efficient cell operation.

Although the invention has been shown and described with respect to a preferred embodiment thereof it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. An electrolysis cell system for producing oxygen and hydrogen comprising:

an electrolysis cell including a pair of gas diffusion electrodes spaced apart, aqueous electrolyte matrix means in the space between said electrodes, means forming a gas space on the nonelectrolyte side of each electrode, one of said gas spaces including inlet means and outlet means, said cell also including a thermal exchange portion having entrance means and exit means;

means for recirculating a portion of one of said product gases from said outlet means, through said thermal exchange portion, to said inlet means and back through said gas space;

means for introducing sufficient water into said recirculating product gas to maintain the temperature of said gas exiting from said thermal exchange portion exit means at a predetermined first temperature;

condenser means disposed in said recirculating gas stream between said thermal exchange portion exit means and said gas space inlet means for removing heat from said recirculating gas stream exiting from said thermal exchange portion and for condensing vaporized water entrained within said recirculating gas; and means for establishing a desired partial pressure of water vapor in said recirculating gas reentering said gas space inlet means.

2. The electrolysis cell system according to claim 1 including means causing the water within said recirculating gas to enter said thermal exchange portion in droplet form to create a temperature gradient across said cell.

3. The electrolysis cell system according to claim 2 wherein said electrolysis cell system is arranged and constructed so that the temperature of said cell decreases from said inlet means to said outlet means across said cell, and wherein said means for establishing a desired partial pressure of water vapor in said recirculating gas entering said gas inlet means includes (A) thermal sensing means for sensing a second temperature of said recirculating gas leaving said condenser, and (B) means responsive to said thermal sensing means for maintaining said second temperature within a range which will result in the desired partial pressure of water vapor in said recirculating gas entering said inlet means.

4. The electrolysis cell system according to claim 3 wherein said condenser means includes means for carrying a coolant into indirect heat exchange relationship with said recirculating gas and wherein said means responsive to said thermal sensing means for maintaining said second temperature within a range which will result in the desired partial pressure of water vapor in said recirculating gas as it reenters said inlet means includes (A) bypass means for bypassing said coolant around said condenser means, and (B) bypass valve means responsive to said thermal sensing means for controlling the proportion of flow of coolant through said condenser means and said bypass means.

5. The electrolysis cell system according to claim 4 including pump separator means in said recirculating gas stream said condenser means and said gas space inlet means for separating out liquid water entrained in said recirculating gas, and means in operable relationship with said pump separator means for taking said separated liquid water out of said recirculating gas and reintroducing it into said recirculating gas between said gas space outlet means and said thermal exchange portion entrance means.

6. The electrolysis cell system according to claim 2 wherein said means for introducing water includes first thermal sensing means for sensing the temperature of the recirculating gas exiting from said thermal exchange portion exit means, pressurized water supply means, first control valve means responsive to said first thermal sensing means for permitting the proper amount of water to pass from said supply means into said recirculating gas to maintain the temperature of said recirculating gas exiting from said thermal exchange portion exit means at said predetermined first temperature.

7. The electrolysis cell system according to claim 6 wherein said recirculating product gas is hydrogen and said electrolysis cell is a base cell.

8. The electrolysis cell system according to claim 6 wherein said electrolysis cell system is arranged and constructed so that the temperature of said cell decreases from said inlet means to said outlet means across said cell, and wherein said means for establishing a desired partial pressure of water vapor in said recirculating gas as it enters said gas inlet means includes (A) second thermal sensing means for sensing a second temperature of said recirculating gas leaving said condenser, and (B) means responsive to said second thermal sensing means for maintaining said second temperature within a range which will result in the desired partial pressure of water vapor in said recirculating gas as it enters said inlet means.

9. The electrolysis cell system according to claim 7 including pump separator means in said recirculating gas stream between said condenser means and said gas space inlet means for separating out liquid water entrained in said recirculating gas, and means in operable relationship with said pump separator means for taking said separated liquid water out of said recirculating gas and reintroducing it into said recirculating gas between said gas space outlet means and said thermal exchange portion entrance means.

10. In the process of generating hydrogen gas and oxygen gas in an electrolysis cell wherein the cell includes a pair of gas diffusion electrodes spaced apart, matrix means for retaining an aqueous electrolyte in the space between said electrodes, means forming a hydrogen gas space on the nonelectrolyte side of one of said pair of electrodes and an oxygen gas space on the nonelectrolyte side of the other of said pair of electrodes, and a thermal exchange portion, the steps of:
supplying current to said cell;
recirculating a portion of one of said product gases from its respective gas space through said thermal exchange portion and back through said gas space;
introducing water into said recirculating product gas for removing heat from said cell, said water being introduced in an amount sufficient to maintain the temperature of said stream exiting from said thermal exchange portion at a predetermined temperature;
condensing vaporized water entrained within said recirculating gas after it exits from said thermal exchange portion and prior to its being reintroduced into said gas space for removing heat therefrom; and
establishing a desired partial pressure of water vapor in said recirculating gas as it reenters said gas space.

11. The process according to claim 10 including the step of causing the water within said recirculating gas to enter said thermal exchange portion in droplet form to create a temperature gradient across said cell.

12. The process according to claim 11 wherein said step of recirculating a portion of one of said product gases includes flowing said product gas through said thermal exchange portion in a direction counter to the flow of said recirculating gas through its respective gas space so that the temperature of said cell decreases across said cell in the direction of the flow of said recirculating gas through its respective gas space.

13. The process according to claim 12 wherein said step of establishing a desired partial pressure of water vapor in said recirculating gas as it reenters said gas space includes the step of maintaining the temperature of said recirculating gas as it reenters said gas space within a range which will result in said desired partial pressure of water vapor.

14. The process according to claim 13 wherein said step of condensing includes the step of carrying a coolant through a heat exchanger into indirect heat exchange relationship with said recirculating gas.

15. The process according to claim 14 wherein said step of maintaining said desired partial pressure of water vapor in said recirculating gas as it reenters said gas space includes bypassing an appropriate portion of said recirculating gas around said indirect heat exchanger thereby removing less heat from said recirculating gas.

16. The process according to claim 15 includng maintaining substantially equivalent product gas pressures in said gas spaces of said cell and wherein said step of recirculating a portion of one of said product gases includes recirculating a portion of said hydrogen produced by said cell.

17. The process according to claim 12 including the step of separating the condensed liquid water entrained in the recirculating gas from the water in vapor form prior to said gas reentering said gas space, bypassing said separated liquid water around said gas space, and reintroducing it into said recirculating gas before said recirculating gas enters said thermal exchange portion.

18. The process according to claim 11 wherein said step of recirculating a portion of one of said product gases includes recirculating a portion of said hydrogen produced by said cell.

19. The process according to claim 11 wherein the step of causing the water to enter said thermal exchange portion in droplet form includes passing all liquid water within said recirculating gas and water added to said recirculating gas through a sprayer positioned immediately upstream of said thermal exchange portion.

* * * * *

UNITED STATES PATENT OFFICE
CERTIFICATE OF CORRECTION

PATENT NO. : 3,905,884
DATED : September 16, 1975
INVENTOR(S) : Edmund K. Parenti, Jr. et al It is certified that error appears in the above-identified patent and that said Letters Patent are hereby corrected as shown below:

Column 4, line 12: "28" should read --38--.

Column 7, line 6: after the word "stream" insert --between--.

Column 8, line 43: "includng" should read --including--.

Signed and Sealed this second Day of December 1975

[SEAL]

Attest:

RUTH C. MASON
Attesting Officer

C. MARSHALL DANN
Commissioner of Patents and Trademarks